(12) United States Patent
Kwok et al.

(10) Patent No.: US 8,456,096 B2
(45) Date of Patent: Jun. 4, 2013

(54) THERMALLY CONTROLLED DRIVER/SWITCHING REGULATOR, AND METHODS OF CONTROLLING AND/OR REGULATING A DRIVER AND/OR SWITCHING REGULATOR

(75) Inventors: Kenneth Kwok, Irvine, CA (US); Jan Krellner, Laguna Niguel, CA (US); Steven Ulbrich, Anaheim Hills, CA (US); Joon Park, Irvine, CA (US)

(73) Assignee: Dongbu HiTek Co., Ltd., Seoul (KR)

( * ) Notice: Subject to any disclaimer, the term of this patent is extended or adjusted under 35 U.S.C. 154(b) by 382 days.

(21) Appl. No.: 12/816,363

(22) Filed: Jun. 15, 2010

(65) Prior Publication Data

US 2011/0193542 A1    Aug. 11, 2011

Related U.S. Application Data

(60) Provisional application No. 61/303,562, filed on Feb. 11, 2010.

(51) Int. Cl.
    *H05B 37/02*    (2006.01)
(52) U.S. Cl.
    USPC ............................................ 315/219; 323/285
(58) Field of Classification Search
    USPC .......................... 315/291, 309; 323/284, 285
    See application file for complete search history.

(56) References Cited

U.S. PATENT DOCUMENTS

| 6,567,922 | B1 * | 5/2003 | Feng .............................. 713/340 |
| 7,262,559 | B2 | 8/2007 | Tripathi et al. |
| 7,723,922 | B2 | 5/2010 | Lee et al. |
| 7,791,326 | B2 * | 9/2010 | Dahlman et al. .............. 323/284 |

FOREIGN PATENT DOCUMENTS

| JP | 2009-4782 A | 1/2009 |
| KR | 10-2005-0089841 A | 9/2005 |

OTHER PUBLICATIONS

"1.6MHz Low Quiescent Current High Efficiency Synchronous Buck Regulator"; ISL9106; Jun. 29, 2007; pp. 1-13; Intersil Americas Inc.
"CMOS Micropower Inverting Switching Regulator"; MAX634/MAX4391; May 1986; pp. 1-12; Maxim Integrated Products, Sunnyvale, CA.
"Digitally Adjustable LCD Bias Supplies"; MAX1620/MAX1621; Jan. 1998; pp. 1-20; Maxim Integrated Products.
"80V, 300mW Boost Converter and Current Monitor for APD Bias Applications"; MAX15031; Jun. 2009; pp. 1-17; Maxim Integrated Products.
"Low-Cost, 3A, 4.5V to 28V Input, 350kHz, PWM Step-Down DC-DC Regulator with Internal Switches"; MAX15041; Jul. 2009; pp. 1-16; Maxim Integrated Products.
"Basic Switching-Regulator-Layout Techniques"; Application Note 2997; Jan. 15, 2004; pp. 1-8; Maxim Integrated Products; www.maxim-ic.com/an2997.
"Switch Allows Low-Voltage Regulator to Start Under Load"; Application Note 951; Jul. 9, 1998; pp. 1-2; Maxim Integrated Products; www.maxim-ic.com/an951.

(Continued)

*Primary Examiner* — Shawn Riley
(74) *Attorney, Agent, or Firm* — The Law Offices of Andrew D. Fortney; Andrew D. Fortney

(57) ABSTRACT

Circuits for regulating and/or controlling integrated circuits such as drivers and switching regulators generally include a first switch configured to control or regulate a current, voltage drop or voltage boost; a first regulator or driver configured to transmit first pulses to the first switch, the pulses having a first pulse width; and pulse width modulation circuitry configured to (i) reduce the first pulse width when a first thermal threshold is met and (ii) increase the first pulse width when a second thermal threshold is met, the second thermal threshold being less than the first thermal threshold.

19 Claims, 5 Drawing Sheets

OTHER PUBLICATIONS

Sang Yun Lee, Chang Hoon Baek, Do Hun Kim and Hyung Suk Kim; "LED Driving Device"; Patent Abstracts of Japan; Publication No. 2009-004782; Publication Date Jan. 8, 2009; Japan Patent Office, Japan.

Ajay Tripathi, Bernd Clauberg, Young Kee Min, Raghuram Narasimhan and Rohit Khetarpal; "LEDS Driver"; Korean Patent Abstracts; Publication No. 1020050089841 A; Publication Date: Sep. 8, 2005; Korean Intellectual Property Office, Republic of Korea.

* cited by examiner

THERMALLY CONTROLLED DRIVER/SWITCHING REGULATOR, AND METHODS OF CONTROLLING AND/OR REGULATING A DRIVER AND/OR SWITCHING REGULATOR

RELATED APPLICATIONS

This application claims the benefit of U.S. Provisional Application No. 61/303,562, filed Feb. 11, 2010.

FIELD OF THE INVENTION

The present invention generally relates to the field of analog integrated circuits. More specifically, embodiments of the present invention pertain to drivers, switching regulators, and methods for regulating and/or controlling such integrated circuits.

DISCUSSION OF THE BACKGROUND

Four types of fault detection mechanisms usually occur in a typical high-voltage, multi-channel light emitting diode (LED) driver integrated circuit (IC). Referring to FIG. 1, they are LED open 10, LED short 20, over voltage protection (OVP) 30, and over temperature protection (OTP) 40. Each of these faults will usually cause shut down of one or more LED channels, or even the entire IC, to prevent damage to the device.

In a large LCD panel (e.g., at least 10") using white LEDs (WLEDs) as backlight, each channel typically uses a string of 8-10 WLEDs connected in series. A common boost converter drives the input to the LED strings. Each channel has an independent current source to regulate the current in each of the LED strings. To minimize on-chip power dissipation, the boost output voltage from the LED driver IC is regulated to minimize voltage drop across the current sources. Because of LED forward voltage process tolerance, the voltage drop across each LED string can differ widely. The IC sets the boost output voltage based on the voltage requirement of the LED string with the largest voltage drop.

When a LED channel has an OPEN fault (e.g., OVP=1), the IC will see a large voltage drop across that channel, hence causing the boost voltage to increase. At some point, the boost voltage will hit an OVP limit set by external resistors. Then, the LED-open detector will activate (12) to detect and disable the open channel (14). Thereafter, boost voltage regulation will be controlled by (e.g., using feedback from) the channel with the next largest LED forward voltage drop, and the boost voltage will return to its nominal level.

It is important to select the OVP threshold voltage precisely so as not to cause undesirable device operation. Choosing an OVP threshold voltage that is too low may cause false LED-open detection or device shutdown (32) due to a prolonged OVP condition (OVP_timer_exp=1). On the other hand, choosing an OVP threshold voltage that is too high may cause device overheating and eventual OTP shutdown (42) of the device when a LED channel is suddenly opened. This is because of an increased power dissipation in the other LED channels as the boost voltage is regulated upwards due to the open channel. If the OVP limit is set too high, the die temperature may increase beyond the OTP limit (OTP_timer_exp=1) before OVP is reached (OVP_timer_exp=1), and the LED open channel can be disabled (14). In each case, the entire LCD panel will be inoperable.

Another LED fault condition is when a particular channel has one or more LEDs shorted in the string (20), causing the net voltage drop across that string to be reduced, resulting in higher power dissipation in that channel. A conventional IC will detect this (22) as a fault condition and disable the LED shorted channel (24) to prevent the IC from overheating. When a particular channel is disabled, the LCD panel will likely have a dark patch or a streak in the screen.

OVP and OTP fault conditions are usually non-recoverable and require the entire device to be power-cycled before it can operate again. Therefore, it is very important to pre-select an appropriate OVP threshold based on the worst-case LED string forward voltage tolerance, the worst-case thermal characteristics of the printed circuit board (PCB) containing the driver IC, and the worst-case ambient conditions and operating environment. Due to the a priori nature of the OVP selection process, a lot of guard-banding is typically involved, resulting in a more stringent LED string forward voltage mismatch specification value, which consequently results in higher panel costs.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to circuits and methods for regulating and/or controlling integrated circuits such as drivers and switching regulators. In one aspect, the circuit generally includes a first switch configured to control or regulate a current, voltage drop or voltage boost; a first regulator or driver configured to transmit first pulses to the first switch, the pulses having a first pulse width; and pulse width modulation circuitry configured to (i) reduce the first pulse width when a first thermal threshold is met and (ii) increase the first pulse width when a second thermal threshold is met, the second thermal threshold being less than the first thermal threshold.

An exemplary method generally includes applying pulses from the first regulator or driver to one or more first switches configured to control or regulate a current, voltage drop or voltage boost, the pulses having a first duty cycle; decreasing a width of the pulses so that the pulses have a second duty cycle less than the first duty cycle when the regulator or driver reaches a first thermal threshold; and increasing the width of the pulses so that the pulses have a third duty cycle greater than the second duty cycle when the integrated circuit reaches a second thermal threshold less than the first thermal threshold.

The present disclosure advantageously provides circuits and methods for regulating and/or controlling integrated circuits, whereby catastrophic shutdown events can be avoided by the use of thermal feedback. Such circuits and methods also advantageously provide an integrated circuit which can continue to function safely even under fault conditions. Another advantage of the technology disclosed in the present application is that a device containing or employing such circuits or methods can operate under temporarily high ambient temperature conditions, and fully recover to normal operation when ambient conditions return to a normal or acceptable level. These and other advantages of the present invention will become readily apparent from the detailed description below.

DETAILED DESCRIPTION

Figure 1:
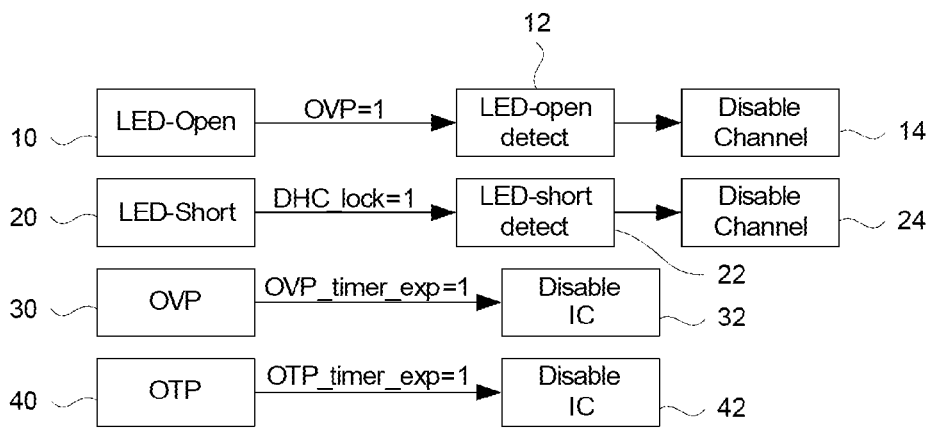
FIG. 1 shows four conventional fault conditions in a conventional LED lighting system.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "connected to," "coupled with," "coupled to," and "in communication with," are generally used interchangeably herein, but are generally given their art-recognized meanings. The invention, in its various aspects, will be explained in greater detail below with regard to exemplary embodiments.

Exemplary Methods of Regulating or Controlling a Driver or Switching Regulator

The present invention further relates to a method of regulating or controlling a driver or switching regulator circuit using a thermal control mechanism. In general, the method generally includes applying pulses from the first regulator or driver to one or more first switches configured to control or regulate a current, voltage drop or voltage boost, the pulses having a first duty cycle; decreasing a width of the pulses so that the pulses have a second duty cycle less than the first duty cycle when the regulator or driver reaches a first thermal threshold; and increasing the width of the pulses so that the pulses have a third duty cycle greater than the second duty cycle when the integrated circuit reaches a second thermal threshold less than the first thermal threshold.

In the present invention, catastrophic shutdown events are avoided by employing thermal feedback and other techniques described herein. This allows for a more flexible OVP threshold selection as well as allowing use of lower-cost LEDs with larger forward voltage tolerances. Typically, the OVP threshold is fixed to the highest voltage the IC can tolerate on the boost switching pin (see, e.g., 120/122 in FIG. 2; also see the discussion of FIG. 3 below). An internally set, fixed OVP hard limit (122) allows the system designer to relax tolerances when selecting the OVP threshold based on operating conditions of the IC. It also allows use of lower cost LEDs with larger forward voltage tolerances in series-connected LED strings, without fear of catastrophic thermal failure or other issues.

Figure 2:
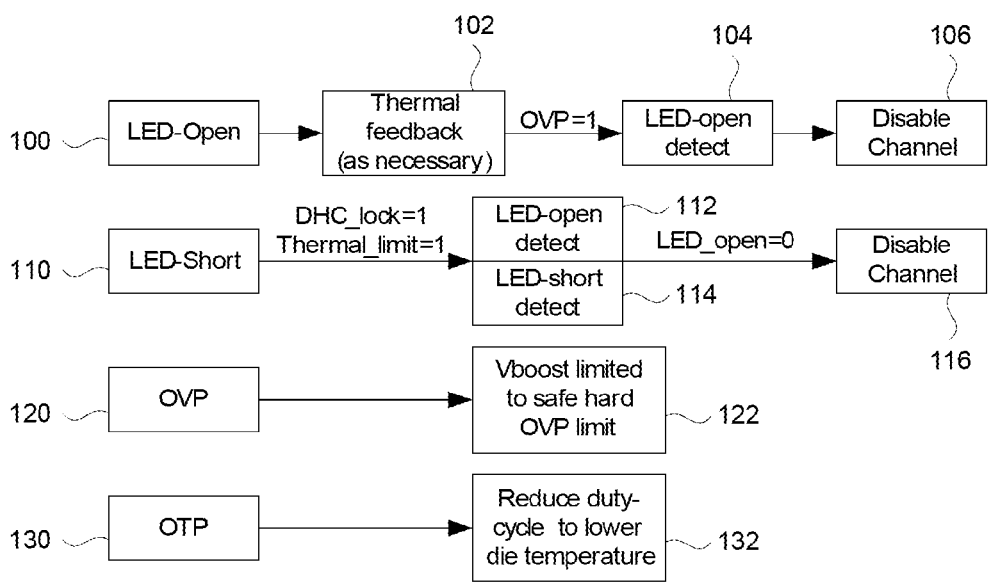
FIG. 2 shows how the four conventional fault conditions are processed in an exemplary embodiment of the present driver/switching regulator in an LED lighting system.

Referring to FIG. 2, when a LED open occurs (100), the boost voltage (e.g., at charge storage node 322 in FIG. 4) will regulate upwards as in the conventional case. During this process, the device 310 will likely hit the predetermined thermal limit (fault 130 in FIG. 2) due to increased power dissipation in the other LED channels 320 in FIG. 4. An on-chip thermal detector (e.g., thermal feedback logic 250 in FIG. 3, circuit 500 in FIG. 5, or circuit 550 in FIG. 5B) continuously monitors the die temperature to sense this condition.

When the die temperature reaches the upper thermal limit threshold (e.g., about 140° C.±5° C.), the duty-cycle of the LED channels are automatically limited (action 132 in FIG. 2) by pulse width modulation (PWM) control circuitry (e.g., 240 in FIG. 3) and gradually reduced to lower on-chip power dissipation, keeping the die temperature at or slightly below the upper temperature limit. This allows the LED open fault (100 in FIG. 2) to be safely detected without the device 310 (FIG. 4) going into OTP shutdown (e.g., action 42 in FIG. 1) before the boost voltage reaches the OVP voltage limit (e.g., result 122 in FIG. 2). When the boost voltage (e.g., at node 322 in FIG. 4) finally reaches the OVP limit (OVP=1), the LED open channel is detected (action 104 in FIG. 2) and disabled (action 106 in FIG. 2), and the boost voltage at node 322 will regulate downwards using a voltage drop across another LED string (see, e.g., one of LED strings 320a-320f in FIG. 4). When the boost voltage (e.g., at node 322) reaches its nominal operating level, on-chip power dissipation is minimized and the die temperature decreases below a lower thermal threshold (e.g., for "safe" operation of the IC; generally, a temperature of about 125° C.±5° C.), and the thermal feedback circuit 250 (FIG. 3) will gradually reduce or remove its duty-cycle limiting function on the LED channels (e.g., through PWM driver circuitry 210).

In the case of an LED short (fault 110 in FIG. 2; a prerequisite to DHC_lock=1), the present circuit and method will not take any action to disable the LED channel in which the short is present unless the IC is approaching or exceeding a thermal threshold (e.g., a temperature of from about 125° C. to about 140° C., which can trigger an active "Thermal_limit" signal [Thermal_limit=1]; see also fault 130 in FIG. 2). Therefore, LED short detection is active when the device is operating under thermal feedback. This allows backlight panels or other LED lighting systems to operate normally under a minor LED short condition, as well as in an environment where the LED string voltage mismatch is unusually large, as long as the IC can tolerate the increased power dissipation. When the IC reaches the thermal limit (e.g., a timer or counter that counts a length of time that the IC has exceeded the thermal threshold) due to the LED short, the duty-cycle of the LED outputs are reduced (e.g., action 132 in FIG. 2, performed by PWM control logic 240 in FIG. 3) to allow the IC 310 (FIG. 4) to continue operating safely until the shorted LED channel is disabled (e.g., action 116 in FIG. 2).

The use of thermal feedback (action 102 in FIG. 2) and fixed, process-driven OVP limits 122 allows the IC 200/310 to continually function safely, even under LED fault conditions. Also, these approaches allow the device to operate under a temporarily high ambient temperature condition (e.g., a high CPU load, or a laptop left in the sun), and fully recover to normal operation when ambient conditions return to a normal or acceptable level.

Figure 3:
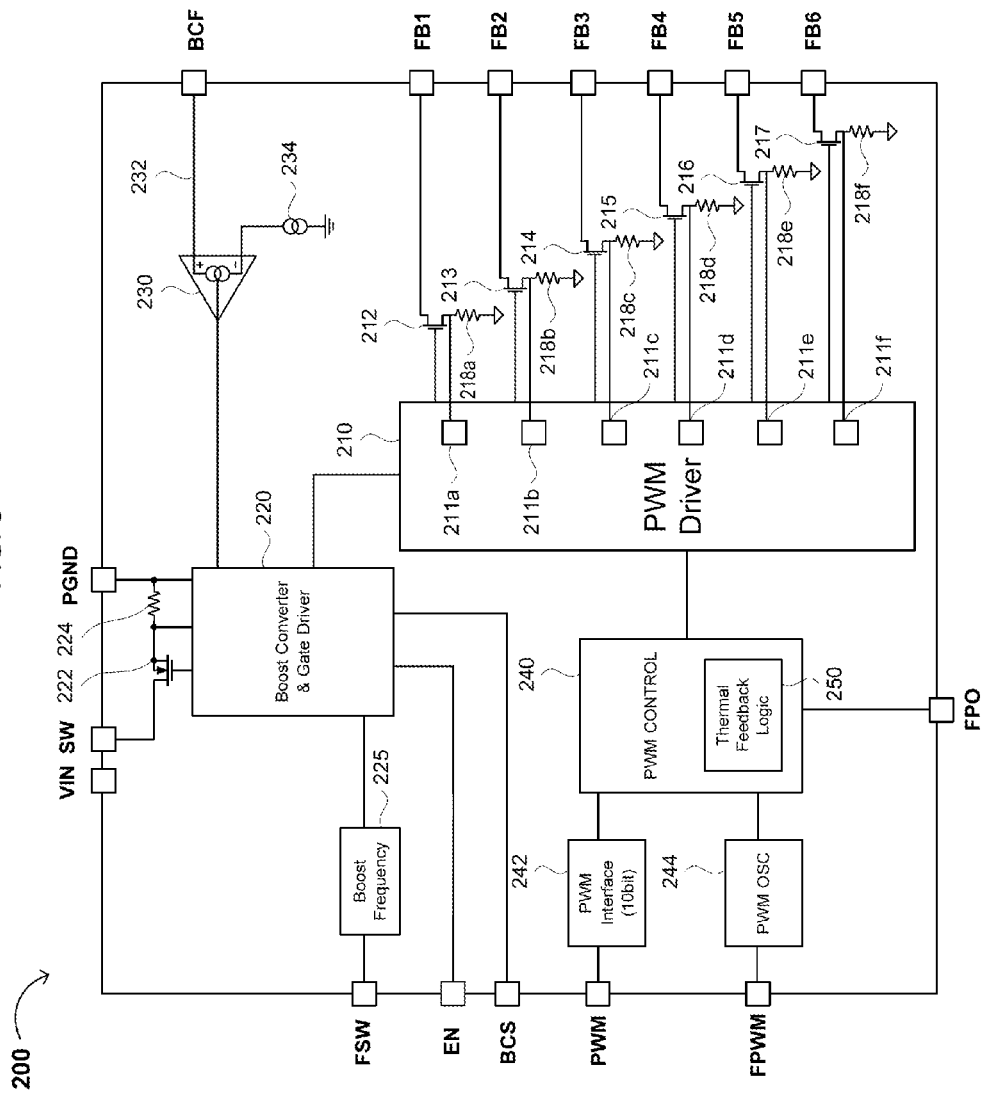
FIG. 3 is a diagram showing exemplary circuitry in accordance with embodiments of the present invention.

Exemplary Integrated Circuits and Lighting Systems Using Thermally Controlled Fault Detection and Correction FIG. 3 shows a first exemplary integrated circuit 200 employing a pulse width modulator (PWM) driver 210, boost converter and gate driver logic 220, a current source 230, and pulse width modulator control logic 240. The PWM driver 210 drives the gates of transistors 212-217, which each receive an output or feedback current from an LED channel (see block 220 of FIG. 3). The boost converter and gate driver logic 220 (FIG. 3) drives the gate of a switch or transistor 222 that boosts the voltage at an input to the LED channels. Resistor 224 may function similarly to resistors 218a-218f, in that it allows monitoring of a current or voltage between the transistor 222 and the resistor 224. The pulse widths of the PWM driver 210 are controlled by PWM control logic 240, which includes thermal feedback logic 250.

A PWM generator may include a PWM oscillator 244, a PWM interface 242 and PWM control logic 240. The internal PWM generator/logic 240 controls the frequency and duty-cycle of the LED current drivers in driver block 210. In one embodiment, all LED drivers 212-218 can run at the same PWM duty-cycle and frequency. In other embodiments, individual LED drivers 212, 213, 214, 215, 216, 217 and 218 can run at independent PWM duty-cycles and/or frequencies, to match more closely an ideal or target voltage drop across a given series of LEDs (see, e.g., the individual series of LEDs in LED block 320, FIG. 4). The PWM frequency provided by PWM oscillator 244 may be programmed (e.g., using a resistor 345 [FIG. 4] that may have a resistance of from about 1 kΩ to about 1 MΩ) from the PWM frequency programming pin (FPWM; FIG. 3) to ground. In various embodiments, the range of PWM frequencies can be adjustable from about 500 Hz to about 24 kHz. In one embodiment, the resistor 345 has a resistance of about 60 kΩ, and the PWM frequency is about 6 kHz.

The PWM interface 242 provides a multi-bit digital interface to enable programming of a precise PWM duty cycle from an external source (e.g., the user or a microprocessor, microcontroller, or analog and/or digital signal processor). In one example, the PWM interface 242 has a duty cycle resolution of 10 bits. The FPO pin provides an output from the PWM control logic 240 indicating the absence or occurrence of a fault condition. In one example, a fault condition is indicated by the PWM control logic 240 when a binary signal having a low logic level (e.g., a binary 0 state) is output on the FPO pin. In various embodiments, there may be more than one FPO pin, outputting one or more signals (or "flags") indicating an open/short LED channel, an over-temperature (OTP) fault condition, and/or a boost current limit (OVP) fault condition.

In various embodiments, thermal feedback logic 250 comprises circuitry configured to sense the voltage drop across one or more P-N junctions in a thermal detector circuit (e.g., across one or more P-N diodes). For example, referring to FIG. 5A, thermal feedback logic 500 has an input V, P-N diodes 521 and 522, resistors 531 and 532, variable resistor 533, and differential (or operational) amplifier 541. The thermal detector circuit 500 generally operates in a manner known in the art. In some embodiments, the input V is a reference voltage having a predetermined value (generally greater than the combined voltage drops across resistor 531 and P-N diode 521, or across resistor 532 and P-N diode 522), and the combined P-N diode 522 and variable resistor 533 may function as a varactor diode. The differential amplifier 541 receives inputs from nodes 511 and 512, respectively. The voltage drop across P-N diode 521 differs from the voltage drop across P-N diode 522 (or varactor diode 522/533) as a function of temperature. As a result, the voltage or current at the output of the differential amplifier 541 (e.g., OUTPUT) has a value that corresponds in a known manner to the temperature of the integrated circuit (e.g., integrated circuit 200 in FIG. 3). The output of the differential amplifier 541 is then monitored to determine a fault condition that may trigger one or more of the actions described with respect to FIG. 2.

Figure 5A:
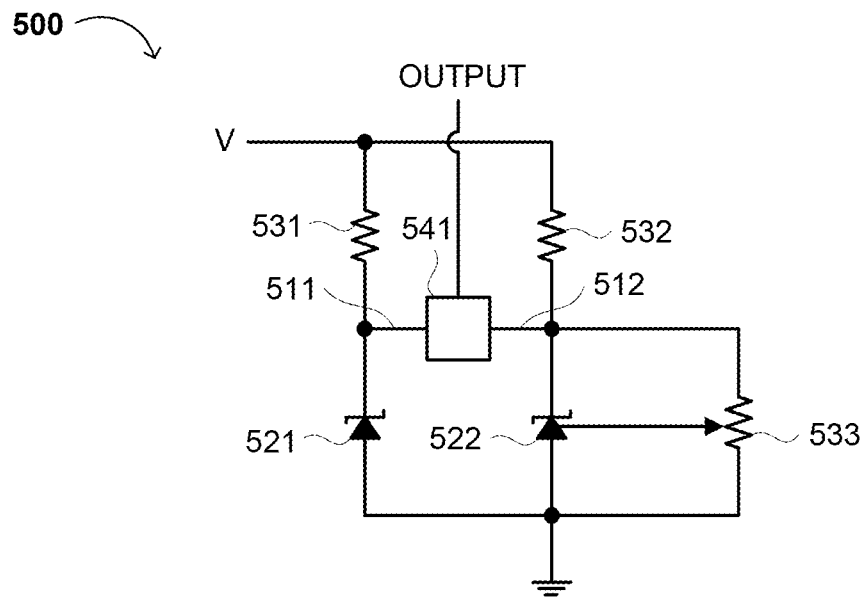
FIGS. 5A and 5B are diagrams showing exemplary thermal detectors suitable for use in the present thermal feedback logic.
Figure 5B:
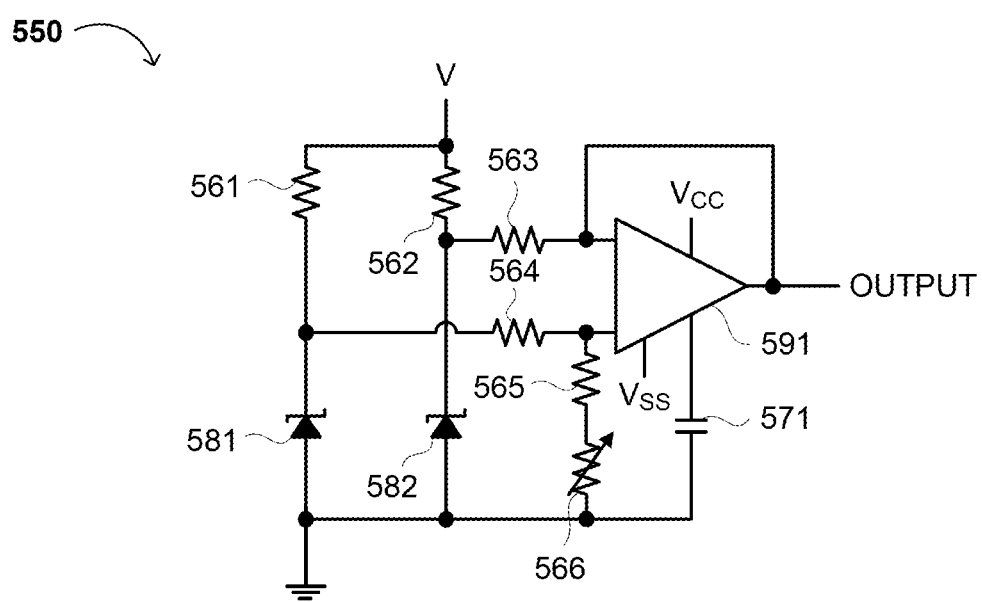

FIG. 5B shows a second example of thermal feedback logic (e.g., thermal detector circuit 550) that also operates similarly to thermal detector circuit 500 (FIG. 5A), in a manner generally known in the art. For example, thermal detector circuit 550 has an input V (e.g., a reference voltage), P-N diodes 581 and 582, resistors 561-565, variable resistor 566, capacitor 571, and differential (or operational) amplifier 591. The differential amplifier 591 receives a first (lower) input from the node between resistors 564 and 565, effectively measuring the voltage drop across P-N diode 581, and a second (higher) input from the node at an end of resistor 563 opposite to the node between resistors 562 and 563, effectively measuring the voltage drop across P-N diode 582. As for the thermal detector circuit 500 of FIG. 5A, the voltage drop across P-N diode 581 in FIG. 5B differs from the voltage drop across P-N diode 582 as a function of temperature. As a result, the voltage or current at the output of the differential amplifier 591 (e.g., OUTPUT) has a value that corresponds in a known manner to the temperature of the integrated circuit (e.g., integrated circuit 200 in FIG. 3). The output of the differential amplifier 591 is then monitored to determine a fault condition that may trigger one or more of the actions described with respect to FIG. 2.

Figure 4:
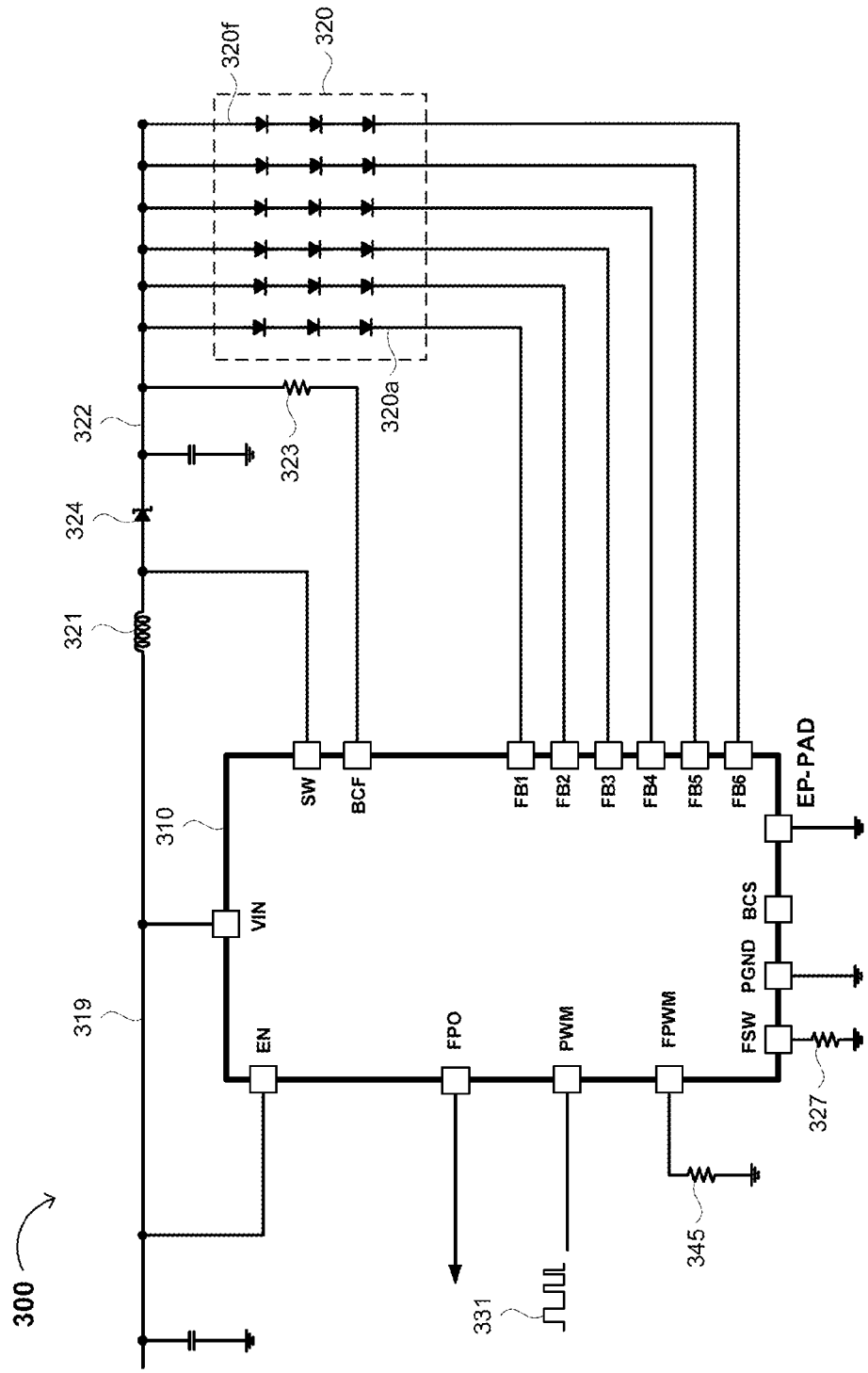
FIG. 4 is a diagram showing an exemplary system including an integrated circuit embodying the present invention.

Referring back to FIG. 3, the boost converter or regulator 220 is configured to generate the output voltage (e.g., at node 322 of FIG. 4) to drive the LED strings (e.g., 320 in FIG. 4). The boost regulator 220 (FIG. 3) can be current-mode controlled (e.g., by current source 230, which also receives a feedback current 232 and a fixed or reference current from current source 234) and includes a high current switching MOSFET 222. Loop compensation for the boost regulator 220 is provided internally. The switching frequency can be programmed using boost frequency logic 225 to a value between 350 kHz and 1.5 MHz using a resistor 327 (FIG. 4) to ground, tied to the FSW input. The boost regulator 220 (FIG. 3) can utilize true current feedback, and therefore does not require a resistor divider to provide a feedback voltage. Instead, a resistor 323 connected between the boost output (at output SW in FIG. 4) and the BCF input provides the feedback current on current feedback path 232 (FIG. 3). Examples of the current source 230, boost converter and other circuitry receiving an output from the current source 230, and the feedback input (e.g., at node 232) are provided in U.S. patent application Ser. No. 12/693,407, filed Jan. 25, 2010, the relevant portions of which are incorporated herein by reference.

To adjust the maximum boost output voltage (e.g., at node 322 in FIG. 4), the feedback resistor 323 can be changed. In this manner, the maximum output voltage of the boost regulator 220/222 (FIG. 2) can be adjusted from its nominal value (e.g., of from 24V to 42V, and in one example, 40V) by an amount proportional to the percentage change in the resistance of the feedback resistor. The BCS pin connection allows an optimized gain and bandwidth setting to be selected based on different combinations of switching inductor 321 properties and frequency settings. An enable pin (e.g., EN pin in FIGS. 3-4) is configured to enable the IC 200/310 whenever the input or supply voltage (e.g., the voltage supplied to pin VIN in FIGS. 3-4) is available. In one embodiment, the signal received at the enable pin active when in a high digital logic state (e.g., a binary "1" value, or a voltage equivalent to the highest supply voltage at that pin or node, such as Vcc). As shown in FIG. 4, the enable pin can be tied to the input or supply voltage (e.g., VIN), for example at node 319 in FIG. 4. The ground potential pin (e.g., PGND in FIGS. 3-4) provides a ground potential to the integrated circuit 200/310. The ground potential may be an external ground potential, a reference ground potential (e.g., configured to be equal to zero [0] volts), or a virtual ground potential.

During PWM dimming or reduction (e.g., caused by a decrease or reduction in the duty cycle of the PWM driver 210 from the control signal[s] generated by the PWM control logic 240), the output voltage of the boost converter 220 (or, in one embodiment, the output voltage of switch 222) may be automatically adjusted to the minimum voltage capable of driving the LEDs 320 at the required current. A dynamic headroom control (DHC) circuit (not shown) within the PWM driver logic 210 continually monitors the current in the LED chains and transmits a signal to boost converter 220 to adjust the output voltage at node 322 accordingly. For example, current/voltage monitors/detectors 211a-211f sense a current or voltage at the node between the switch 212-217 and the corresponding resistor 218a-218f, then the DHC circuit compares that current or voltage to the current or voltage at the feedback pins FB1-FB6 and transmits a signal to the boost converter 220 configured to drive the current across switches 212-217 towards zero. However, the signal to the boost converter 220 is further configured not to exceed a predetermined value, set by the OVP threshold.

Figure 6:
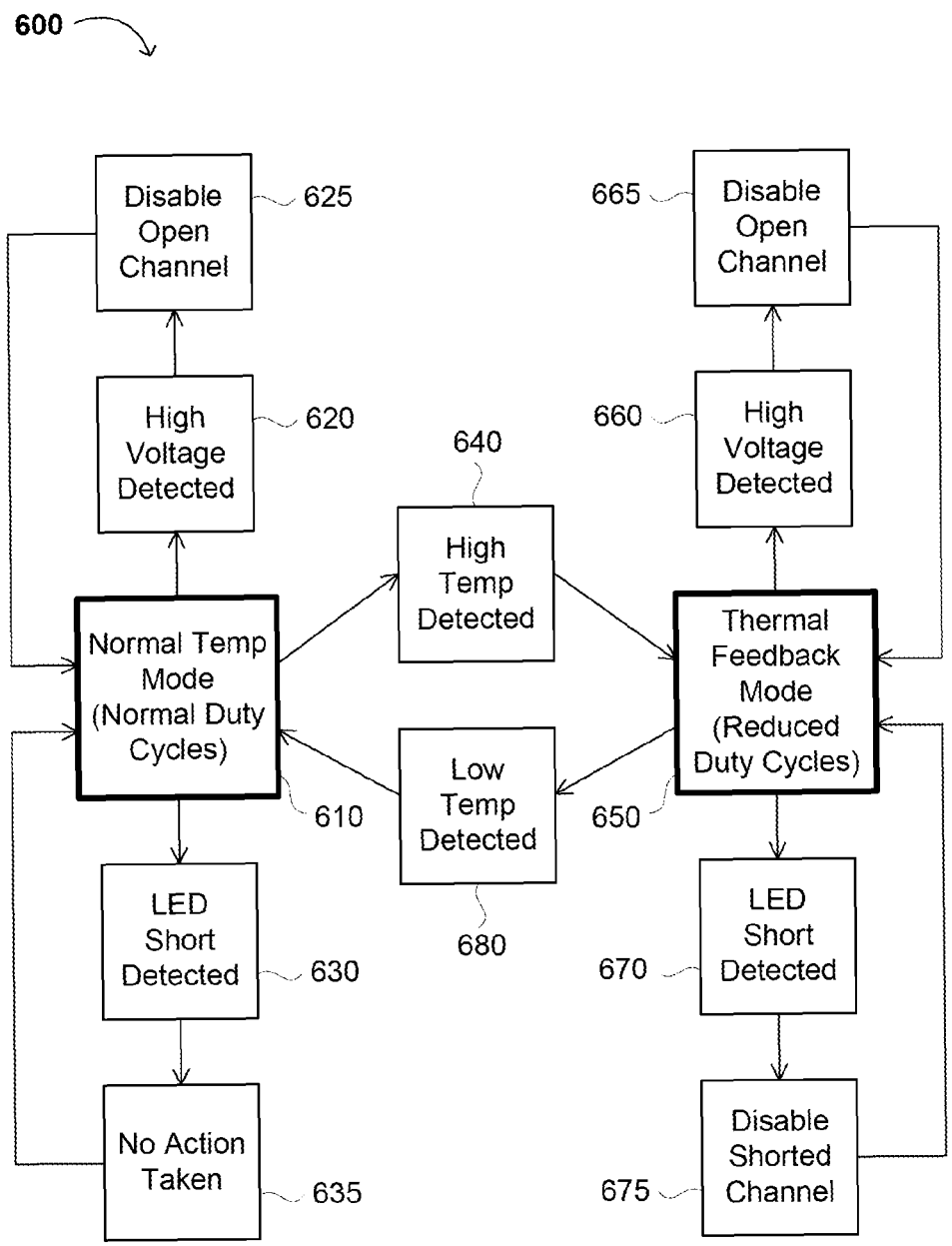
FIG. 6 is a flow chart showing an exemplary method for regulating a driver/switching regulator IC.

Exemplary Methods for Controlling Regulator Integrated Circuits and Lighting Systems Using Thermally Controlled Fault Detection and Correction FIG. 6 is a flow chart 600 showing an exemplary method for regulating a driver/switching regulator IC (e.g., IC 200/310 in FIGS. 3-4). The IC generally begins in a normal operation mode 610 (e.g., in a normal temperature mode, in which the PWM control logic 240 operates according to one or more predetermined criteria, such as providing a first duty cycle of, for example, from 10% to 80% (e.g., 20% to 50%, or any other range of values therein). During the normal operation mode 610, three possible events or conditions may be detected: (1) if a voltage exceeding an OVP threshold is detected (e.g., at 620) on the common supply of the LED strings (e.g., node 322 in FIG. 4), then the channel(s) that cannot sustain a predetermined LED current (which channel[s] may be assumed to be open) is/are disabled (e.g., at 625); (2) if a short is detected (e.g., at 630) on one of the LED channels, then no action is taken (e.g., at 635); or (3) if a high temperature is detected (e.g., at 640; for example, when a first thermal threshold has been met or exceeded), then the IC may enter a thermal feedback mode (e.g., at 650) in which the duty cycle of the PWM driver (e.g., 210 in FIG. 3) applied to the LED channels (e.g., 320 in FIG. 4) is reduced (e.g., to a second duty cycle which is less than the first duty cycle). In various embodiments, the second duty cycle is reduced to a value of from 10% to 40%. In other embodiments, the duty cycle is reduced periodically and/or incrementally by a value of from 2% to 20% (e.g., from 5 to 10%) until a low temperature condition is detected (e.g., at 680) or until a minimum duty cycle (e.g., at least 5%, 10% or any other value greater than 5%) is reached. The duty cycle may be reduced periodically at a frequency of from once every 10 seconds (0.1 Hz) to one million times per second (1 MHz; e.g., 1 Hz to 100 kHz, or any other range of values therein).

During thermal feedback (e.g., PWM duty cycle reduction) mode 650, three possible events or conditions may be detected: (1) if a voltage exceeding an OVP threshold is detected (e.g., at 660) on the common supply of the LED strings (e.g., node 322 in FIG. 4), then the channel(s) that cannot sustain the LED current (which channel[s] may be assumed to be open) is/are disabled (e.g., at 665); (2) if a short is detected (e.g., at 670) on one of the LED channels, then the channel is disabled (e.g., at 675); or (3) if a low/normal temperature is detected (e.g., at 680, in which a second predetermined thermal threshold is met, wherein the second thermal threshold is lower than the first thermal threshold), then the IC may return to the normal temperature (e.g., standard or default PWM duty cycle) mode at 610, in which the duty cycle of the PWM driver (e.g., 210 in FIG. 3) applied to the LED channels is increased (e.g., to a third duty cycle greater than the second duty cycle) or returned to the first (e.g., normal mode or default) duty cycle.

The following table describes exemplary inputs and outputs of the integrated circuit 200 and/or integrated circuit 310:

TABLE 1

Inputs and outputs.

| SYMBOL | DESCRIPTION |
|---|---|
| EN | Enable pin (active-high). Can be tied to VIN to enable the IC whenever VIN supply is available. |
| FSW | The switching frequency of the boost regulator 220; can be programmed by a resistor to ground. |
| FPO | Fault indication output (active-low; open-drain). Flags open/short LED channel, overtemperature (OTP), and boost current limit (OVP) faults. |
| FB6 | LED 6 string output. Tie pin to ground or leave open if the string is not used. |
| FB5 | LED 5 string output. Tie pin to ground or leave open if the string is not used. |
| FB4 | LED 4 string output. Tie pin to ground or leave open if the string is not used. |
| FB3 | LED 3 string output. Tie pin to ground or leave open if the string is not used. |
| FB2 | LED 2 string output. Tie pin to ground or leave open if the string is not used. |
| FB1 | LED 1 string output. Tie pin to ground or leave open if the string is not used. |
| FPWM | Programs LED PWM frequency using a resistor 345 between FPWM and ground. |
| BCF | Boost output current feedback pin, connected to resistor 323. |
| SW | Switch pin. This is the drain of the internal LDMOS power switch 222. |
| BCS | Boost internal compensation select pin. Tie to ground, VPC, or leave open to select optimized compensation network. |
| VIN | Input supply pin. Can receive input voltage 319. Must be locally by-passed with a capacitor to ground. |
| PWM | LED PWM dimming control pin. Can be set or controlled by a graphics controller. |
| PGND | Ground. |

Open Circuit Detection

Each LED string in light system/display 320 (FIG. 4) receives a supply voltage at node 322, which in turn receives current from switch 222 (controlled by boost converter/driver 220), through inductor 321 and diode 324. The LED string outputs at pins FB1-FB6 is monitored for LED short (110 in FIG. 2) and LED open (100 in FIG. 2) faults. Should a LED string get disconnected from the LED driver output, or if an LED fails (an open fault), the DHC logic in PWM driver 210 (FIG. 3) will force the boost regulator 220 to gradually increase its output voltage until it is clamped at the OVP voltage limit (condition 122 in FIG. 2). The PWM control logic 240 will then disable the open channel (e.g., by reducing the duty cycle of the PWM driver 210 to 0%). Thereafter, the DHC logic in PWM driver 210 regulates the output voltage at node 322 back to its normal level. All other unaffected channels remain turned on.

The FPO pin is pulled low permanently (e.g., by connecting the FPO pin to a ground potential through a programmable switch) if an open channel has been detected. However, if an open channel is detected during device power-up, it is assumed that the channel is unused, and no fault will be indicated on the FPO pin.

Due to increased power dissipation across the LED channels 320 during a LED open failure (fault 100 in FIG. 2), the device 300 may enter thermal regulation (132 in FIG. 2). During thermal regulation, the duty cycle of all channels is automatically reduced temporarily to lower power dissipation of the IC 310. The IC 310 remains enabled as long as one or more LED channels 320 remain enabled.

Short Circuit Detection

The short circuit detection function 114 (FIG. 2) remains disabled until the IC 310 reaches a certain temperature limit (fault 130). A shorted LED within a string of LEDs will increase power dissipation across the corresponding LED driver (e.g., 212-217, FIG. 3), leading to a temperature rise in the IC 310. However, as long as the IC 310 can handle the increased power dissipation, it is not necessary to disable the faulty channel.

Should the IC trip its OTP temperature threshold (e.g., the thermal feedback logic detects a temperature of about 140° C. or higher; "Thermal_limit=1" in FIG. 2), the short circuit detection circuit is enabled (action 114 in FIG. 2), and the LED channel with the short circuit (e.g., an ON voltage above 7V) is disabled (e.g., similar to pulling the FPO pin low, but by connecting the corresponding FB pin FB1, FB2, FB3, FB4, FB5 or FB6 or the gate of the corresponding switch 212, 213, 214, 215, 216 or 217 to ground using a programmable switch).

Thermal Protection

The IC 310 may constantly monitor the die temperature during operation (e.g., by use of thermal feedback logic 250 in FIG. 3, circuit 500 in FIG. 5A, or circuit 550 in FIG. 5B). If the die temperature exceeds the OTP threshold, the duty-cycle of all LED channels 320 will be reduced appropriately by PWM control logic 240 (FIG. 3) to maintain die temperature just below the OTP limit. When the die temperature is more than a threshold amount (e.g., 15-30° C.) below the OTP threshold, the duty-cycle limiting threshold will be adjusted appropriately by the PWM control logic 240 to allow a larger duty-cycle. Duty cycle control can be relatively easily implemented when the relationship between PWM duty cycle and die temperature increase is approximately linear (e.g., a reduction in duty cycle from 100% to 50% decreases the rate of die temperature increase by one-half). Alternatively, instead of reducing the duty cycle, OTP limits can be avoided by controlling the voltage drop (e.g., keeping the voltage drop below a predetermined maximum) across the LED driver switches 212-217.

Throughout this process, the device 310 remains enabled, but operating at a reduced duty-cycle. While duty-cycle limiting is active, the FPO pin is pulled low to indicate a fault condition.

An Exemplary LED Backlighting System Including a Driver IC

The exemplary system (or device) 300 of FIG. 4 includes a driver/switching regulator (e.g., 210 in FIG. 3) that operates from a single 5V to 24V supply, and is capable of driving up to 10 LEDs in series in each of a plurality of LED strings (e.g., up to 6 or 8 strings such as LED strings 320*a*-320*f* in FIG. 4) with a predetermined maximum current (e.g., of 30 mA, in one embodiment) per string.

The current may be matched among the LED strings within a certain margin (e.g., ±1.0%, in one example). The LED current is set using a resistor (which may be internal or external; see, e.g., resistors 218*a*-218*f* in FIG. 3) to ground. When the resistor is external, the user can program the LED current to a predetermined value, based on the inverse mathematical relationship between the resistance of the resistor and the LED current. The IC 310 incorporates a PWM generator (e.g., PWM oscillator 244, PWM interface 242 and PWM control 240 in FIG. 3) with up to 10 bit resolution. The PWM generator is capable of operating at a frequency of from about 60 Hz to about 200 kHz (e.g., 600 Hz to 24 kHz, or other range out of the auditory band to minimize auditory noise or buzzing). The frequency of operation can be set using a resistor 345 to ground.

LED dimming is achieved with pulse width modulation (PWM) on the PWM pin. The frequency on the PWM pin can be from about 60 Hz to about 100 kHz (e.g., 130 Hz to 5 kHz). The duty cycle of the PWM signal 331 can be measured with the same resolution as the PWM generator (e.g., up to 10 bit resolution). The frequency of the duty cycle of the PWM signal 331 can also be increased and/or phase-shifted (e.g., as described herein or as is otherwise known in the art) before being applied to the outputs of the LED drivers 212-217.

The integrated boost regulator 220 receives a dynamic headroom control (DHC) signal from the PWM driver 210 to automatically set the output voltage at charge storage node 322 to the minimum required by the LED current drivers. The frequency of the boost converter 220 is programmable (e.g., from 300 kHz to 1.5 MHz) using a resistor 327 to ground.

CONCLUSION/SUMMARY

Circuits for regulating and/or controlling integrated circuits such as drivers and switching regulators generally include a first switch configured to control or regulate a current, voltage drop or voltage boost; a first regulator or driver configured to transmit first pulses to the first switch, the pulses having a first pulse width; and pulse width modulation circuitry configured to (i) reduce the first pulse width when a first thermal threshold is met and (ii) increase the first pulse width when a second thermal threshold is met, the second thermal threshold being less than the first thermal threshold. The method generally includes applying pulses from the first regulator or driver to one or more first switches configured to control or regulate a current, voltage drop or voltage boost, the pulses having a first duty cycle; decreasing a width of the pulses so that the pulses have a second duty cycle less than the first duty cycle when the regulator or driver reaches a first thermal threshold; and increasing the width of the pulses so that the pulses have a third duty cycle greater than the second duty cycle when the integrated circuit reaches a second thermal threshold less than the first thermal threshold.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit, comprising:
a first switch configured to control or regulate a current, voltage drop or voltage boost;
a first regulator or driver configured to transmit first pulses to the first switch, the pulses having a first pulse width;
pulse width modulation circuitry comprising a thermal detector, the pulse width modulation circuitry configured to (i) reduce the first pulse width when the thermal detector detects that a first thermal threshold is met, and (ii) increase the first pulse width when the thermal detector detects that a second thermal threshold is met, the second thermal threshold being less than the first thermal threshold; and
a short detection circuit configured to (i) detect a shorted channel, and (ii) upon detecting the shorted channel, maintain current across the shorted channel if the first thermal threshold is not met.

2. The circuit of claim 1, wherein the first switch controls or regulates the current or voltage drop.

3. The circuit of claim 2, further comprising a second switch configured to control or regulate the voltage boost.

4. The circuit of claim 3, comprising a plurality of the first switches, and each first switch controls or regulates a current or voltage drop in a respective circuit receiving the boosted voltage.

5. The circuit of claim 4, wherein the first regulator or driver transmits first pulses to each of the first switches, each of the first pulses having the first pulse width.

6. The circuit of claim 5, wherein the pulse width modulation circuitry includes thermal feedback logic configured to determine when the first and second thermal thresholds are met.

7. The circuit of claim 3, further comprising a second regulator or driver configured to transmit second pulses to the second switch.

8. The circuit of claim 7, wherein the second regulator or driver receives a control signal from the first regulator or driver, the control signal representing an occurrence of an overvoltage threshold being met in a circuit receiving the boosted voltage.

9. The circuit of claim 1, wherein the short detection circuit is further configured to, upon detecting the shorted channel, disable the shorted channel if the first thermal threshold is met.

10. The circuit of claim 1, wherein the short detection circuit is further configured to, upon detecting the shorted channel, maintain current across the shorted channel if the second thermal threshold is met.

11. A method of controlling a first regulator or driver in an integrated circuit, comprising:
applying pulses from the first regulator or driver to one or more first switches configured to control or regulate a current, voltage drop or voltage boost, the pulses having a first duty cycle;
decreasing a width of the pulses so that the pulses have a second duty cycle less than the first duty cycle when a thermal detector detects that the regulator or driver has reached a first thermal threshold;
increasing the width of the pulses so that the pulses have a third duty cycle greater than the second duty cycle when the thermal detector detects that the regulator or driver has reached a second thermal threshold less than the first thermal threshold; and
detecting whether there is a shorted channel, and upon detecting said shorted channel, maintaining current across the shorted channel if the regulator or driver has not reached the first thermal threshold.

12. The method of claim 11, wherein the first switch(es) control or regulate the current or voltage drop.

13. The method of claim 12, further comprising applying pulses from a second regulator or driver to a second switch configured to control or regulate the voltage boost.

14. The method of claim 13, wherein the second regulator or driver limits the voltage boost to a predetermined maximum corresponding to an overvoltage threshold being met in a circuit receiving the boosted voltage.

15. The method of claim 11, wherein the first and third duty cycles are equal or substantially equal to each other.

16. The method of claim 11, further comprising, upon detecting the shorted channel, disabling the shorted channel if the regulator or driver has reached the first thermal threshold.

17. The method of claim 16, further comprising, upon detecting the shorted channel, opening the shorted channel if the regulator or driver is below the second thermal threshold.

18. The method of claim 11, further comprising determining whether the controlled or regulated current, voltage drop or voltage boost includes an open circuit, and when the controlled or regulated current, voltage drop or voltage boost includes an open circuit, disabling a channel comprising the open circuit.

19. The circuit of claim 9, wherein the short detection circuit is further configured to, upon detecting the shorted channel, maintain current across the shorted channel if the second thermal threshold is met.

* * * * *